United States Patent
Chopra et al.

(10) Patent No.: US 12,340,205 B2
(45) Date of Patent: Jun. 24, 2025

(54) SYSTEMS AND METHODS FOR CONCERTED UPGRADE DEPLOYMENT FOR OPEN RADIO ACCESS NETWORK (O-RAN) COMPONENTS

(71) Applicant: Rakuten Symphony, Inc., Tokyo (JP)

(72) Inventors: Akashdeep Chopra, Tokyo (JP); Chandan Kumar Singh, Tokyo (JP); Ashish Madan, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 157 days.

(21) Appl. No.: 18/175,488

(22) Filed: Feb. 27, 2023

(65) Prior Publication Data
US 2024/0289110 A1 Aug. 29, 2024

(51) Int. Cl.
*G06F 8/65* (2018.01)
*H04L 41/082* (2022.01)

(52) U.S. Cl.
CPC .............. *G06F 8/65* (2013.01); *H04L 41/082* (2013.01)

(58) Field of Classification Search
CPC ................ G06F 8/65; H04L 41/082
USPC ................................. 717/168–178
See application file for complete search history.

(56) References Cited

U.S. PATENT DOCUMENTS

| | | | | |
|---|---|---|---|---|
| 7,062,765 B1 * | 6/2006 | Pitzel | ........................ | G06F 8/64 717/168 |
| 11,133,988 B2 * | 9/2021 | Ozawa | ................ | H04L 41/0866 |
| 11,184,782 B2 * | 11/2021 | Kim | ...................... | H04W 24/08 |
| 11,838,176 B1 * | 12/2023 | Vanjare | ................. | G06F 9/4451 |

OTHER PUBLICATIONS

O-Ran Alliance., "O-RAN Alliance Working Group 4—Management Plane Specification" 2021, O-RAN Alliance e.V. , 205 pages. (Year: 2021).*

* cited by examiner

*Primary Examiner* — Ted T. Vo
(74) *Attorney, Agent, or Firm* — HAUPTMAN HAM, LLP

(57) ABSTRACT

A system, method and non-transitory computer-readable medium including instructions executable by one or more processors to display, a listing of one or more Open Radio Access Network (O-RAN) units; receive, by an orchestrator tool, a first user selection of a first set of O-RAN units; receive a first user entry of a version identifier of a first upgrade; receive a second user entry of a path associated with the first upgrade; receive a first request to deploy the first upgrade to the first set of O-RAN units; and in response to receiving the first request, prepare a first standardized configuration payload. The first standardized configuration payload includes the version identifier of the first upgrade; and the path associated with the first upgrade. The instructions cause transmission of the first standardized configuration payload in a first configuration file to a configuration management module or service.

20 Claims, 13 Drawing Sheets

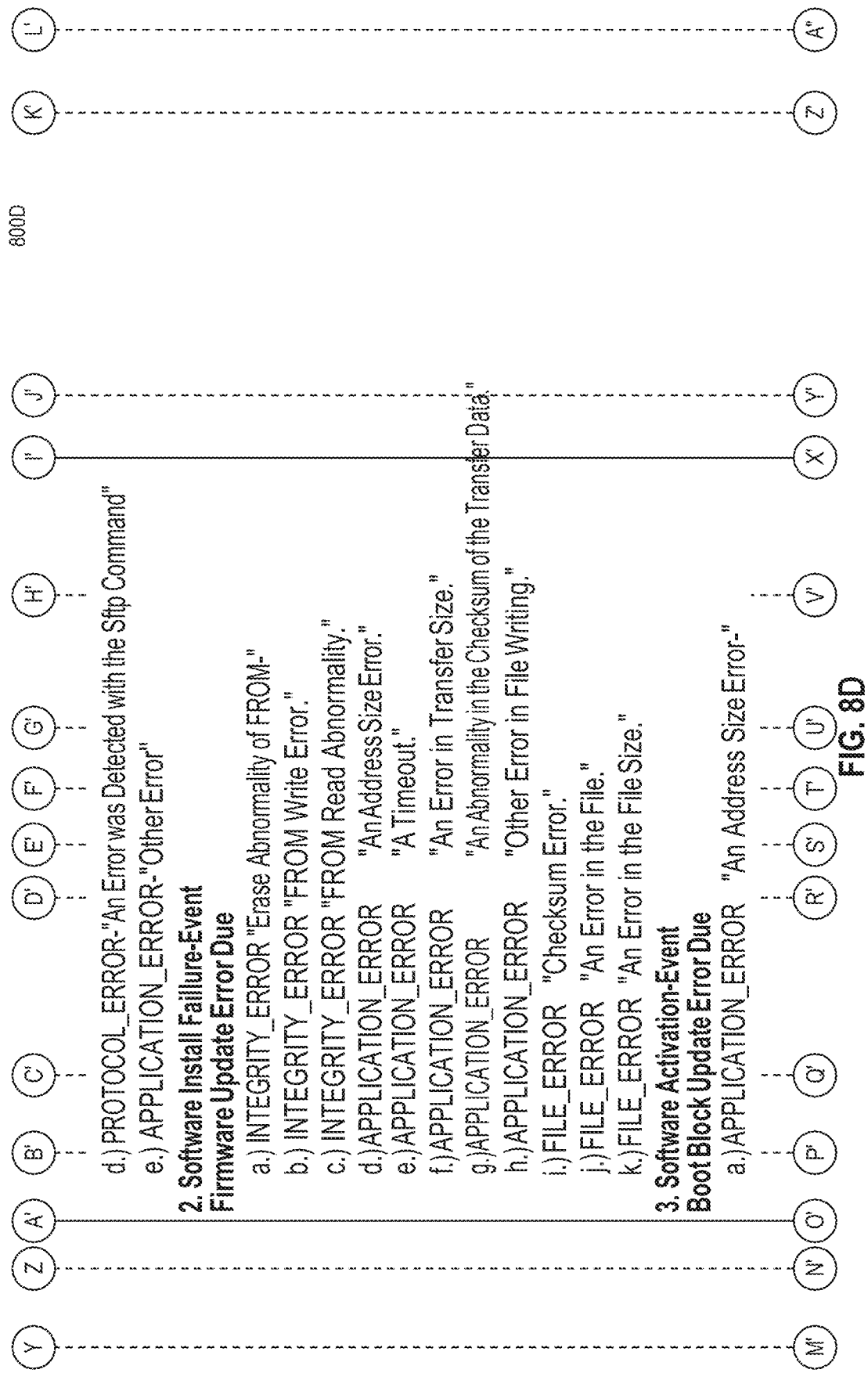

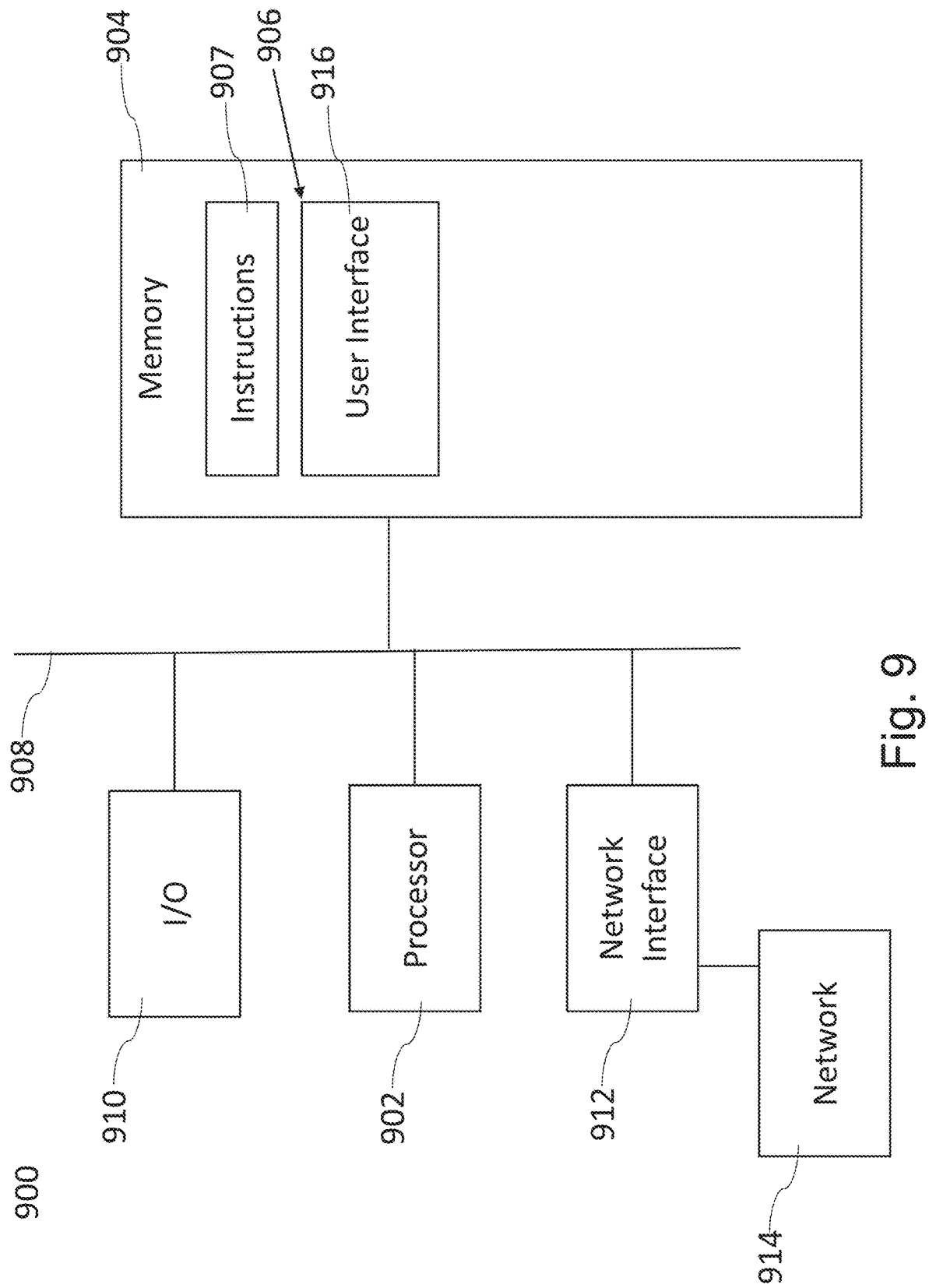

SYSTEMS AND METHODS FOR CONCERTED UPGRADE DEPLOYMENT FOR OPEN RADIO ACCESS NETWORK (O-RAN) COMPONENTS

TECHNICAL FIELD

This description relates to systems and methods for concerted upgrading of Open Radio Access Network (O-RAN) units.

BACKGROUND

Open Radio Access Network (O-RAN) is a technology that aims to create more open and interoperable cellular networks. O-RAN is an evolution of the traditional Radio Access Network (RAN) architecture. In some instances, O-RAN is controlled by a single operator.

The O-RAN architecture uses a distributed system of intelligent software agents, known as "white boxes," to control the network. This allows for greater scalability and the ability to use a variety of different hardware components from different vendors.

SUMMARY

An aspect of this description relates to a system. The system includes a memory storing computer-readable instructions. The system further includes one or more processors connected to the memory, wherein the one or more processors are configured to execute the computer-readable instructions. The one or more processors are configured to execute the computer-readable instructions for receiving a first user selection of a first set of O-RAN units from a selectable list of O-RAN units. The one or more processors are configured to execute the computer-readable instructions for receiving a version identifier of a first upgrade. The one or more processors are configured to execute the computer-readable instructions for receiving a path associated with the first upgrade. The one or more processors are configured to execute the computer-readable instructions for receiving a first request to deploy the first upgrade to the first set of O-RAN units. The one or more processors are configured to execute the computer-readable instructions for, in response to receiving the first request, preparing a first standardized configuration payload, wherein the first standardized configuration payload comprises the version identifier of the first upgrade, and the path associated with the first upgrade. The one or more processors are configured to execute the computer-readable instructions for instructing a transmitter to transmit the first standardized configuration payload in a first configuration file to a configuration management module or service.

An aspect of this description relates to a method. The method includes receiving a first user selection of a first set of O-RAN units from a selectable list of O-RAN units. The method further includes receiving a version identifier of a first upgrade. The method further includes receiving a path associated with the first upgrade. The method further includes receiving a first request to deploy the first upgrade to the first set of O-RAN units. The method further includes, in response to receiving the first request, preparing a first standardized configuration payload, wherein the first standardized configuration payload comprises the version identifier of the first upgrade, and the path associated with the first upgrade. The method further includes transmitting the first standardized configuration payload in a first configuration file to a configuration management module or service.

An aspect of this description relates to non-transitory computer-readable medium including instructions executable by one or more processors to cause the one or more processors to perform operations for concerted upgrade deployment, the operations comprising receiving a first user selection of a first set of O-RAN units from a selectable list of O-RAN units. The operations further comprise receiving a version identifier of a first upgrade. The operations further comprise receiving a path associated with the first upgrade. The operations further comprise receiving a first request to deploy the first upgrade to the first set of O-RAN units. The operations further comprise, in response to receiving the first request, preparing a first standardized configuration payload, wherein the first standardized configuration payload comprises the version identifier of the first upgrade, and the path associated with the first upgrade. The operations further comprise instructing a transmitter to transmit the first standardized configuration payload in a first configuration file to a configuration management module or service.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 9 is a block diagram of computer architecture in accordance with some embodiments.

DETAILED DESCRIPTION

Figure 1:
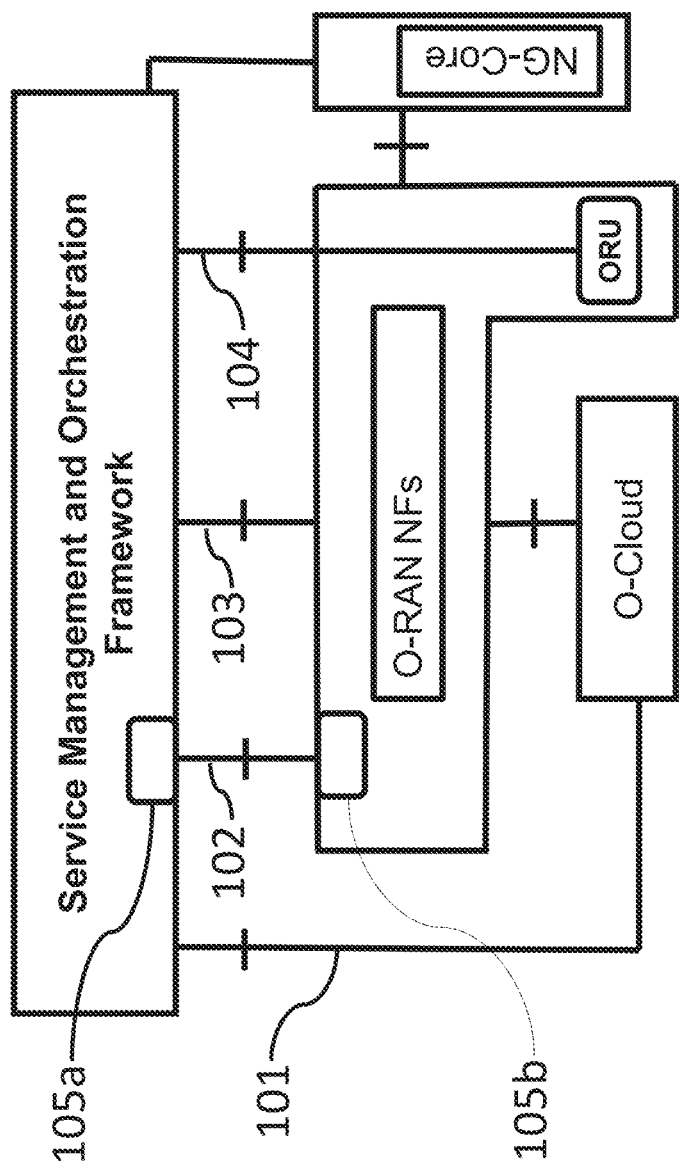
FIG. 1 is a schematic diagram of an O-RAN system, according to at least some embodiments of the subject disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

O-RAN is designed to be more flexible than traditional RAN architecture, allowing for the use of different equipment from different vendors and from different technologies. This creates a more open and competitive environment, which leads to faster innovation and lower costs.

One of advantage of O-RAN is the ability to easily add new features and capabilities to the network. This is made possible by use of software-defined networking (SDN) and network functions virtualization (NFV) technologies.

Another advantage of O-RAN is the ability to create more efficient networks. With the use of white boxes, the network is able to be adjusted to handle specific types of traffic, leading to better performance and lower costs.

O-RAN also provides a more secure network by separating the control plane and the data plane. This allows for greater flexibility in the deployment of security measures, such as firewalls, intrusion detection systems, and encryption.

O-RAN also helps to reduce costs for operators by allowing for the use of cheaper and more efficient hardware components. This is particularly beneficial for operators in developing countries, where costs are potentially a barrier to the deployment of cellular networks.

Another benefit of O-RAN is the ability to better manage and optimize the network. This is made possible by use of advanced analytics and machine learning technologies, which are usable to monitor and analyze network performance in real-time.

O-RAN is also designed to be more energy efficient than traditional RAN architecture. This is achieved through use of advanced power management techniques, such as dynamic voltage and frequency scaling, which helps to significantly reduce energy consumption.

Overall, O-RAN represents a significant advancement in cellular network technology that provides a more open and interoperable architecture, leading to more efficient and cost-effective networks. This technology also helps to reduce costs for operators, improve network performance, and increase security.

Some elements of the O-RAN architecture include the Service Management and Orchestration Framework (SMO), RAN Intelligent Controller (RIC), O-Cloud, O-RAN central unit (OCU), O-RAN distributed unit (ODU), and O-RAN Radio unit (ORU).

There are three main planes in O-RAN architecture:

Control Plane (C-plane): The C-plane is responsible for signaling and control operations in the network by communicating with other network elements to coordinate and control various functions, such as call setup, mobility management and network resource allocation.

User Plane (U-plane): The U-plane is responsible for delivering data and voice services to the end-users by transporting the actual user traffic between the radio access network and the core network.

Management Plane (M-plane): The M-plane provides centralized management and monitoring of the network elements, as well as configuration and maintenance of the network. The M-plane is responsible for monitoring the health and performance of the network, collecting statistics, and managing software upgrades and other network changes.

In some embodiments, a user engages with a user interface which is part of, or separate from, an orchestrator tool. The user interface allows the user to view, for example, a listing of all ORUs in a network. The user is allowed to select one or more of the ORUs in the listing, to which he would like to deploy an upgrade such as a new software version.

The user interface allows the user to input data, such as via a form field, pop-up, or other value input means. For example, the user is allowed to input a number, tag, and/or identifier for a selected upgrade version. In some examples, the user is allowed to input a name or path 304 such as a URL repository path where the selected upgrade version is to be found.

FIG. 1 is a schematic diagram of an O-RAN system 100, according to at least some embodiments of the subject disclosure.

O-RAN system shows four interfaces A1 (102), O1 (103), Open Fronthaul M-plane (102) and O2 (101) that connect SMO (Service Management and Orchestration) framework to O-RAN network functions and O-Cloud. Non-Real-Time RAN Intelligent Controller (Non-RT RIC) is shown at 105*a* in and Near-Real-Time RAN Intelligent Controller (Near-RT RIC) is shown at 105*b*.

ORU Upgrades

Other systems use manual approaches and intervention to deploy software upgrades to, for example, ORUs. In some examples, ORUs in systems exist as thousands, or hundreds of thousands, in number. Manual upgrading of ORUs one-by-one in such systems is very tedious, time-consuming, and inefficient. Manual processes also create delays in the rollout to the network of new upgrades such as those delivered by new software versions. Further, manual approaches to such upgrades are error-prone as relying on human-intervention.

Other systems also use delivery of ORU software as part of an ODU image, which causes unnecessary redeployment of the ODU image just to upgrade the ORU software. In addition to unnecessary packaging, other systems use manual processes such as user login to each ODU one-by-one to change the respective configuration for the ODU to trigger an ORU software upgrade, which is a time-consuming and error-prone process.

Orchestrator Tool

To help improve speed and reduce errors, in some embodiments, an orchestrator tool is disclosed. In some embodiments, functionality of an orchestrator tool is located in one or more server and/or processors and/or tools. For example, an orchestrator tool or a computer system including one or more software modules and/or components, which is executable using, for example, one or more hardware processors. In some examples, an orchestrator tool is a system, or part of a system, where the system includes a memory and/or computer-readable storage medium storing computer-readable instructions, and a processor connected to the memory and/or computer-readable storage medium, wherein the processor is configured to execute the computer-readable instructions.

In some examples, embodiments herein are used to more easily, quickly, and efficiently manage and/or deploy upgrades within an O-RAN architecture. For example, embodiments herein are practically used to allow users to easily select multiple upgrade O-RAN component or unit targets for upgrading with fewer and/or minimal keystrokes.

In some examples, embodiments herein allow for simultaneous, concerted, and/or batch upgrading to O-RAN components. For example, embodiments herein are practically used to allow users to easily deploy concerted and/or automated upgrades to multiple upgrade O-RAN component or unit targets with fewer and/or minimal requests (i.e., batch upgrading).

In some examples, embodiments herein allow for separately upgrading ORAN components. For example, embodiments herein are practically used to allow users to easily isolate O-RAN component or unit types for upgrading without the need for interacting with other components and/or units, and without the need for including software upgrades for one type of component or unit within a packaged software upgrade for another type of component or unit.

Figure 2:
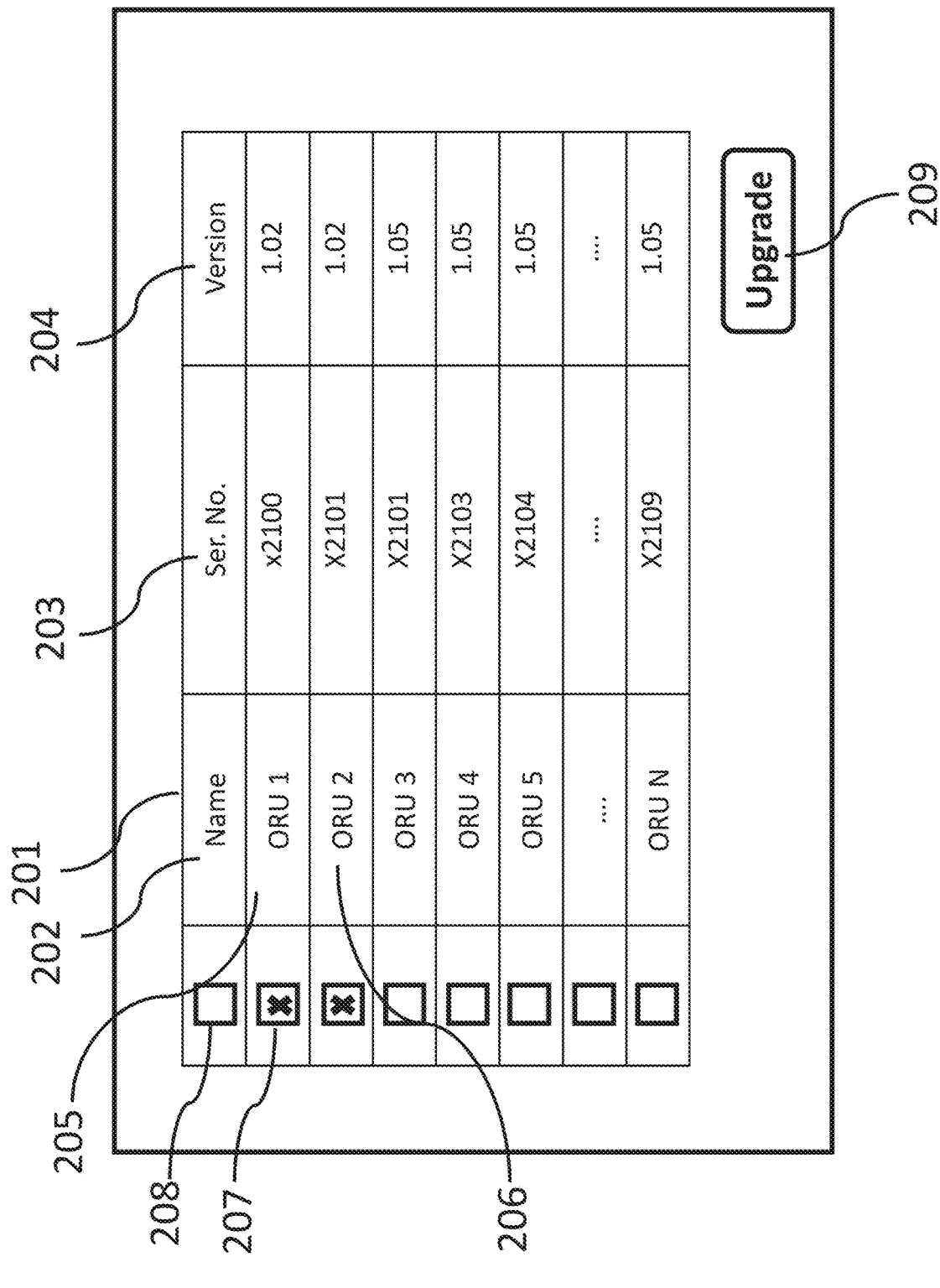
FIG. 2 is a view of a user interface, according to at least some embodiments of the subject disclosure.

FIG. 2 is a view of a user interface 200, according to at least some embodiments of the subject disclosure.

In some embodiments, a user interface 200 is displayed using, for example, a computer displays and/or monitors. The user interface 200 is used to display a listing of O-RAN units, or a listing of units of a particular type, in a network. For example, a listing 201 of ORUs in a network is displayed via the user interface 200. For example, user interface 200 displays a table listing of ORUs in a network. User interface 200 displays a listing of any sort of Virtualized Network Functions (VNFs) or O-RAN components and/or units, or any combination of the aforementioned. Units are listed by a name or tag 202 associated with the units or unit type.

In some embodiments, user interface 200 provides additional information regarding each listed unit. For example, a serial number 203 column is provided which specifies a serial number associated with the unit listed in the corresponding row. In some examples, a version number 204 column is provided which specifies a version number, such as the current software version, associated with the unit listed in the corresponding row.

A user is allowed to select one or more listed units, such as ORUs, such as selected ORU 1 (205) and selected ORU 2 (206) from listing 201, for which the user targets the deployment of an upgrade such as a new software version. A user is allowed to select a unit according to a row via, for example, a checkbox 207 in the corresponding row. In other embodiments, radio buttons or other user interface item selection elements are used. In some embodiments, the user interface allows a "Select All" option 208 to allow more rapid selection of all units listed. In some embodiments, a user is allowed to click an "Upgrade" button 209 or the like to initiate deployment of an upgrade, such as a software upgrade, to the selected ORUs (205-206). In some embodiments, display and/or selection of one or more units are limited according to the accessing user's permission and/or privilege level. For example, a user with administrative privileges and/or privileges to upgrade the units listed are determined by a user login before being allowed to access the user interface. For example, the user interface is a web interface software tool for which access is controlled by login to a user account. A user account is associated with a permission and/or privilege level.

Figure 3:
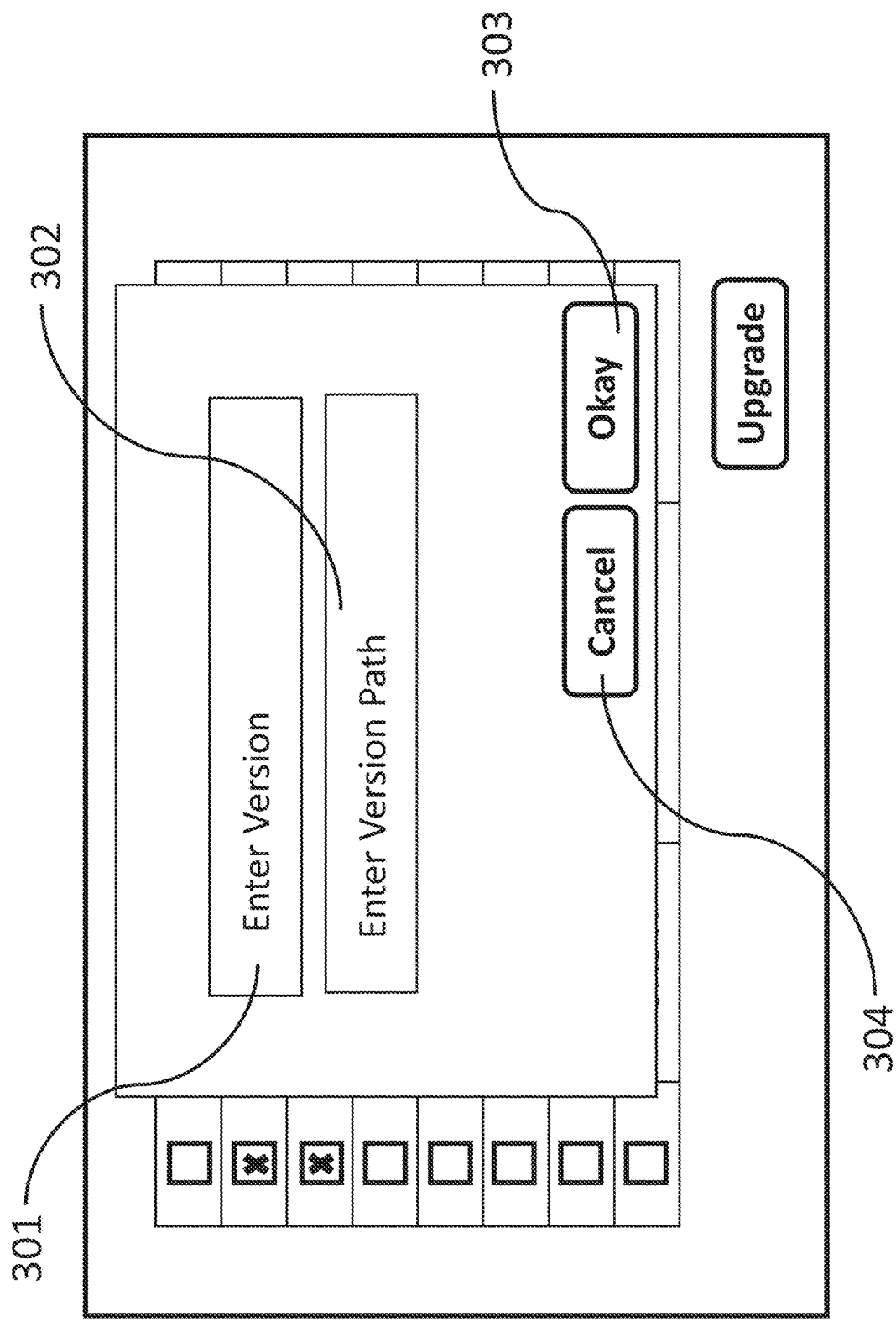
FIG. 3 is a view of a popup window in a user interface, according to at least some embodiments of the subject disclosure.

FIG. 3 is a view of a popup interface 300, according to at least some embodiments of the subject disclosure.

In some embodiments, a user will be shown a popup interface 300 or the like after initiating an upgrade process. For example, in some embodiments, popup interface 300 overlays a user interface as in 200. In some embodiments, popup interface 300 is part of user interface 200. For example, software code, such as HTML and/or script, file includes code for both user interface 200 and/or popup interface 300. Popup interface allows a user to input additional information regarding the desired upgrade. In some examples, a user is allowed to enter a software version 301 number and/or name in an input field. In some examples, a user is allowed to enter a software version path 302, such as a URL for a central repository location where the software version has been stored, in another input field. In some embodiments, a user is allowed to click an "Okay" button 303 or the like to initiate and or continue deployment of an upgrade, such as a software upgrade, to selected ORUs. In some embodiments, a user is allowed to click a "Cancel" button 304 or the like to go back and makes changes to the selected ORUs.

Figure 4:
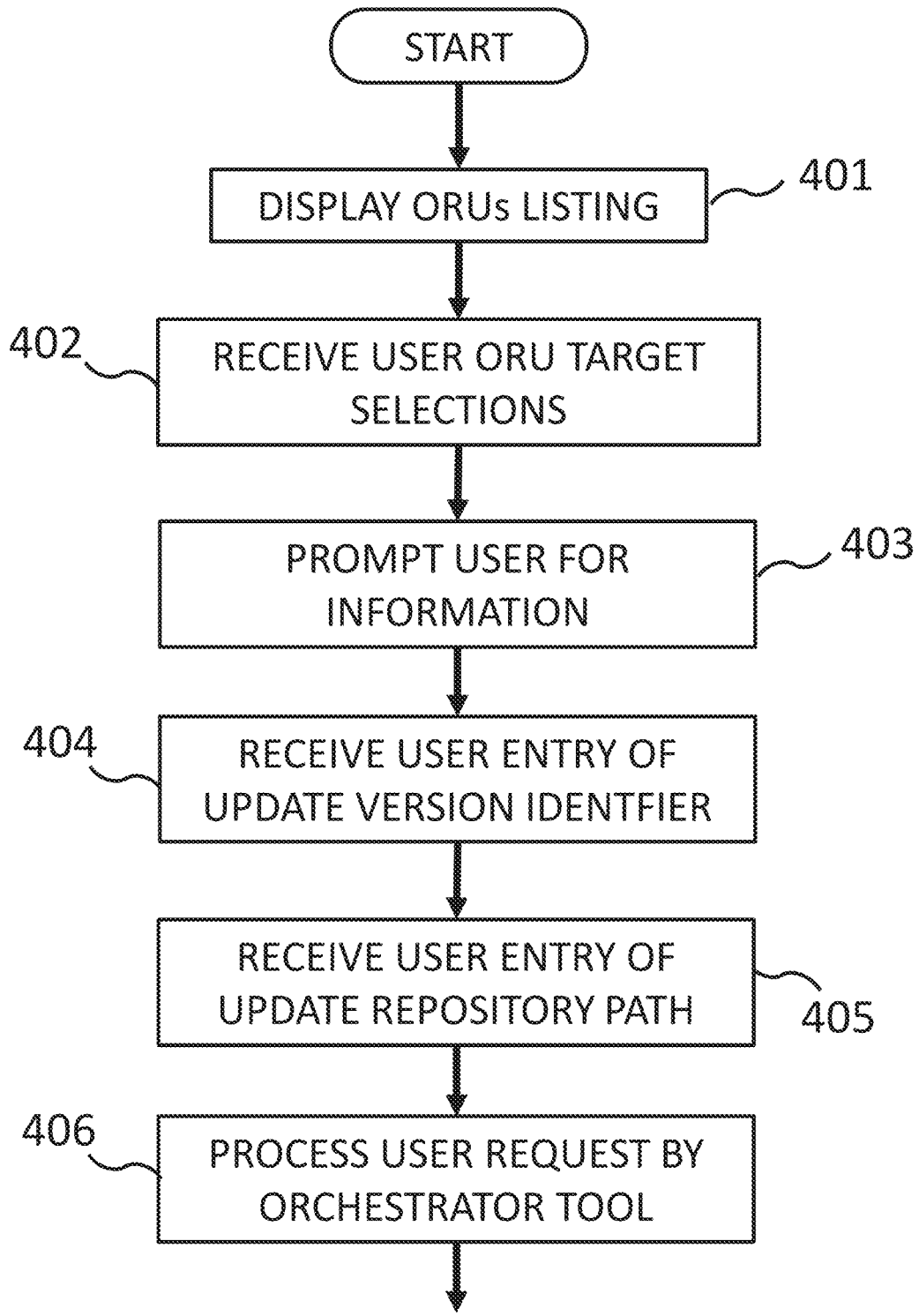
FIG. 4 is a flow chart of a selection sequence using a user interface, according to at least some embodiments of the subject disclosure.

FIG. 4 is a flow chart of a selection sequence 400 using a user interface, according to at least some embodiments of the subject disclosure.

In some embodiments, a sequence of events is shown to illustrate steps and/or actions that occur in response to previous steps and/or actions.

For example, a user interface is displayed to a first user, as described herein. In some examples, the user interface displays a listing of O-RAN units, components, ORUs, etc. at 401. In some embodiments, the user interface displays a listing of O-RAN VNFs. In some embodiments, peripheral information associated with each item in the listing is also displayed, such as serial numbers, version numbers of software installed, etc., for each respective item. In some embodiments, peripheral information is part of the listing. A user is allowed to select one or more of the displayed items for targeting with a software upgrade, for example. Once the user's desired items are selected, the user is allowed to trigger and/or initiate an upgrade process by clicking an "upgrade" button, "submit" button, or the like.

In some embodiments, in response to the user's initiating and/or triggering the upgrade process, an orchestrator tool receives a user's selections 402 and begin a processing sequence based on those selections.

In some embodiments, in response to the user's initiating and/or triggering the upgrade process, an orchestrator tool requests and/or prompt the user for more information regarding the desired upgrade 403.

For example, the user is prompted for more information by an orchestrator tool sending a request to the user. In some embodiments, this request is served as an HTTP/HTTPS (Hypertext Transfer Protocol/Secure) request. In some embodiments, a user is automatically prompted for more information without the need for a back-and-forth request/response cycle to a server and/or orchestrator tool. For example, frontend instructions and/or code automatically prompts entry of information. If it has not already been gathered, as part of a HTML form.

In some embodiments, a user's selections and/or entries using a web-based user interface is submitted via a form or script payload via an HTTP/HTTPS request to a server and/or orchestrator tool. In some examples, a JSON payload including data corresponding to a user's selections and/or entries are prepared on a frontend and/or user end via a web-based user interface.

In some embodiments, the information is information usable to identify and/or locate a software image, such as a software image of the software upgrade version desired to be deployed by the user. For example, a name, version number, tag, and/or other identifying information of a software image is entered by the user 404. In some examples, of a location identifier of a software image, such as a URL path to a location in a central repository where the software image has been stored, is entered by the user 405.

In some embodiments, once a user's selections of one or more items and additional information are entered, a request is sent to an orchestrator tool for processing of the upgrade 406. Processing of the upgrade by the orchestrator tool includes gathering, compiling, and/or producing further additional information to assemble a payload.

Figure 5:
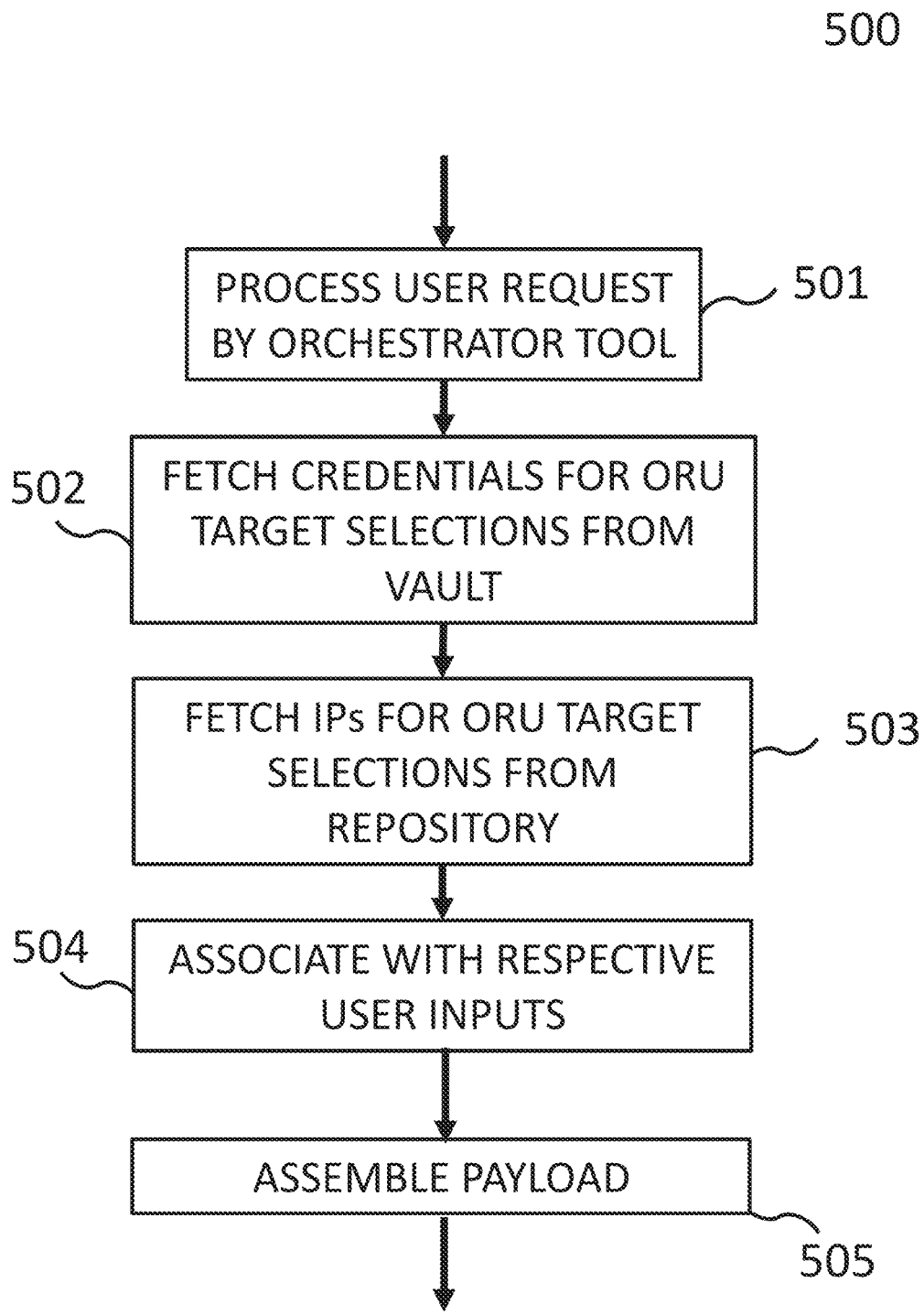
FIG. 5 is a flow chart of a payload preparation sequence, according to at least some embodiments of the subject disclosure.

FIG. 5 is a flowchart of a payload preparation sequence 500, according to at least some embodiments of the subject disclosure.

In this example, a sequence of events is shown to illustrate steps and/or actions that occur in response to previous steps and/or actions.

For example, an orchestrator tool receives and/or use the user selections of ORUs, user's input version, and/or user's input path to prepare a payload. In some examples, payload is a JSON payload or an XML payload.

In some embodiments, an orchestrator tool automatically executes one or more steps or actions to prepare payload. In some examples, in response to a processing request 501, an orchestrator tool identifies and/or fetches one or more credentials needed to login to each of the one or more user-selected ORUs 502. In some examples, an orchestrator tool fetches credentials from a vault securely storing credentials. Similarly, in some examples, in response to a processing request 501, an orchestrator tool fetches a respective IP address for each of the one or more user-selected ORUs 503. In some examples, an orchestrator tool gathers and/or associates the user input version and/or input path with the data items fetched 504. In some examples, an orchestrator tool builds, compile, and/or construct a file name from the user input version and/or input path. The orchestrator tool fetches and/or gathers the respective data items for each ORU of the user-selected ORUs sequentially and/or simultaneously.

In some embodiments, an orchestrator tool automatically assembles, combines, and/or compiles some or all of the aforementioned to prepare and/or assemble payload 505.

Figure 6:
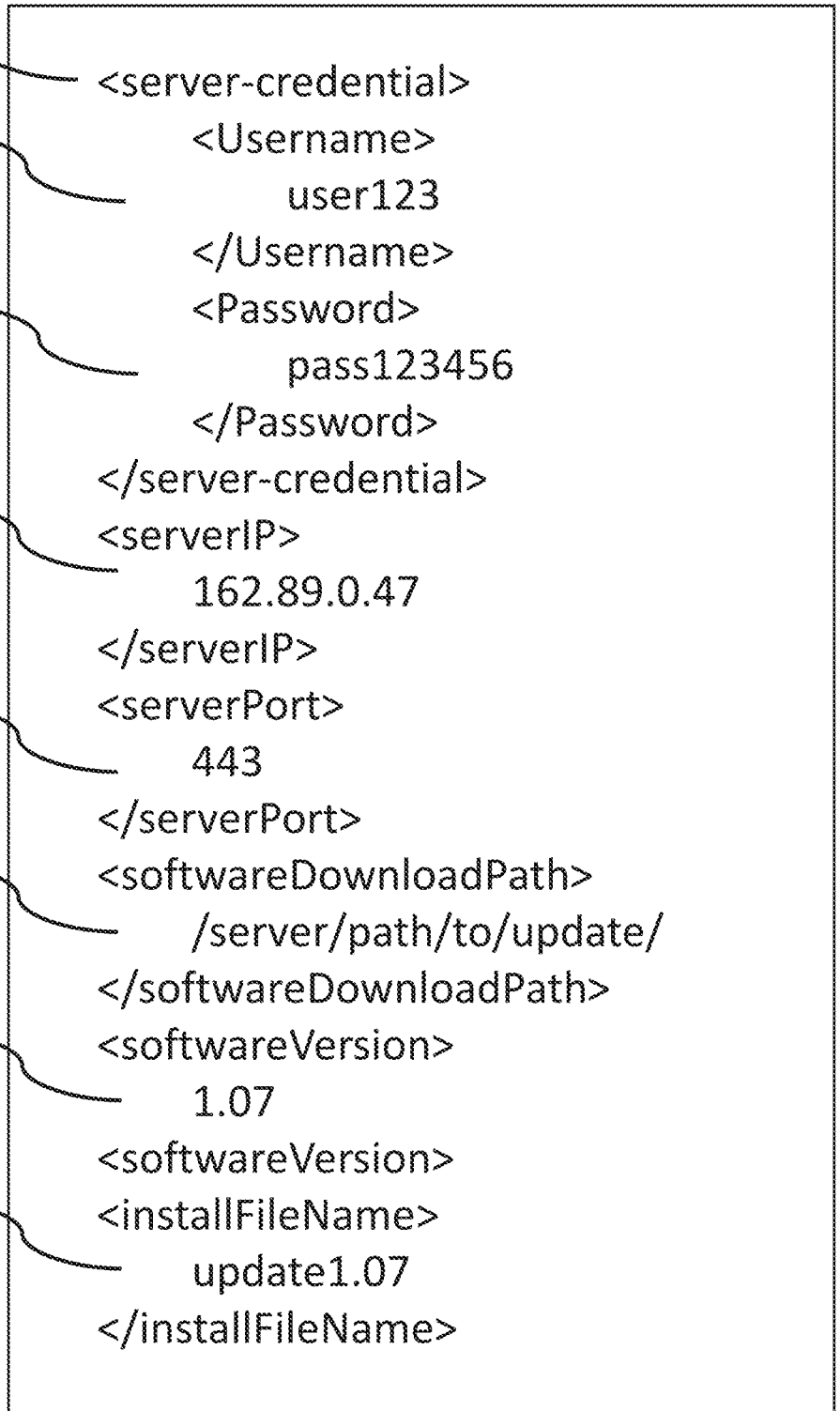
FIG. 6 is a view of a payload, according to at least some embodiments of the subject disclosure.

FIG. 6 is a view of payload 600, according to at least some embodiments of the subject disclosure.

In some examples, a payload assembled and/or prepared by the orchestrator tool includes a set of credentials section 601, such as between "<server-credential>" and "</server-credentials>" tags. Server credentials include a user name section 602, such as between "<Username>" and "</Username>" tags. Server credentials include a password section 603, such as between "<Password>" and "</Password>" tags.

In some examples, a payload assembled and/or prepared by the orchestrator tool includes a server IP section 604, such as between "<serverIP>" and "</serverIP>" tags.

In some examples, a payload assembled and/or prepared by the orchestrator tool includes a server port section 605, such as between "<serverPort>" and "</serverPort>" tags.

In some examples, a payload assembled and/or prepared by the orchestrator tool includes a server download path section 606, such as between "<softwareDownloadPath>" and "</softwareDownloadPath>" tags.

In some examples, a payload assembled and/or prepared by the orchestrator tool includes a software version section 607, such as between "<softwareVersion>" and "</softwareVersion>" tags.

In some examples, a payload assembled and/or prepared by the orchestrator tool includes an install file name section 608, such as between "<installFileName>" and "</installFileName>" tags.

In some embodiments, payload prepared by an orchestration tool is forwarded or delivered to a configuration module.

Management of ORUs occurs in the M-plane. For example, in M-plane, the ODU and/or Network Management Service (NMS) manages ORUs. In some embodiments, a hierarchical model or a hybrid model many be used as a configuration model for ORU management.

Hierarchical Model

In a hierarchical model configuration, ORUs is managed by a respective ODUs.

Hybrid Model

In a hybrid model configuration, ORUs is managed by one or NMSs and/or respective ODUs.

In some embodiments, a hierarchical configuration model is used. In some embodiments, a hybrid configuration model is used.

In some examples, payload prepared by an orchestration tool is forwarded or delivered to a configuration module such as a Configuration Management as a Service (CMaaS) module or service for configuration according to a hierarchical model for ORU management. In this example, the CMaaS module or service prepares and/or formats one or more software configuration files, commands, and/or operations. In some examples, the CMaaS module or service prepares and formats an XML software configuration file.

In some embodiments, the CMaaS module or service delivers a configuration file to one or more VDUs/ODUs to trigger an ORU upgrade process.

A VDU subsequently begins an automatic ORU upgrade/update process. After an ORU upgrade, such as a software update, is completed, a Fault Management as a Service (FMaaS) process is triggered.

Figure 7:
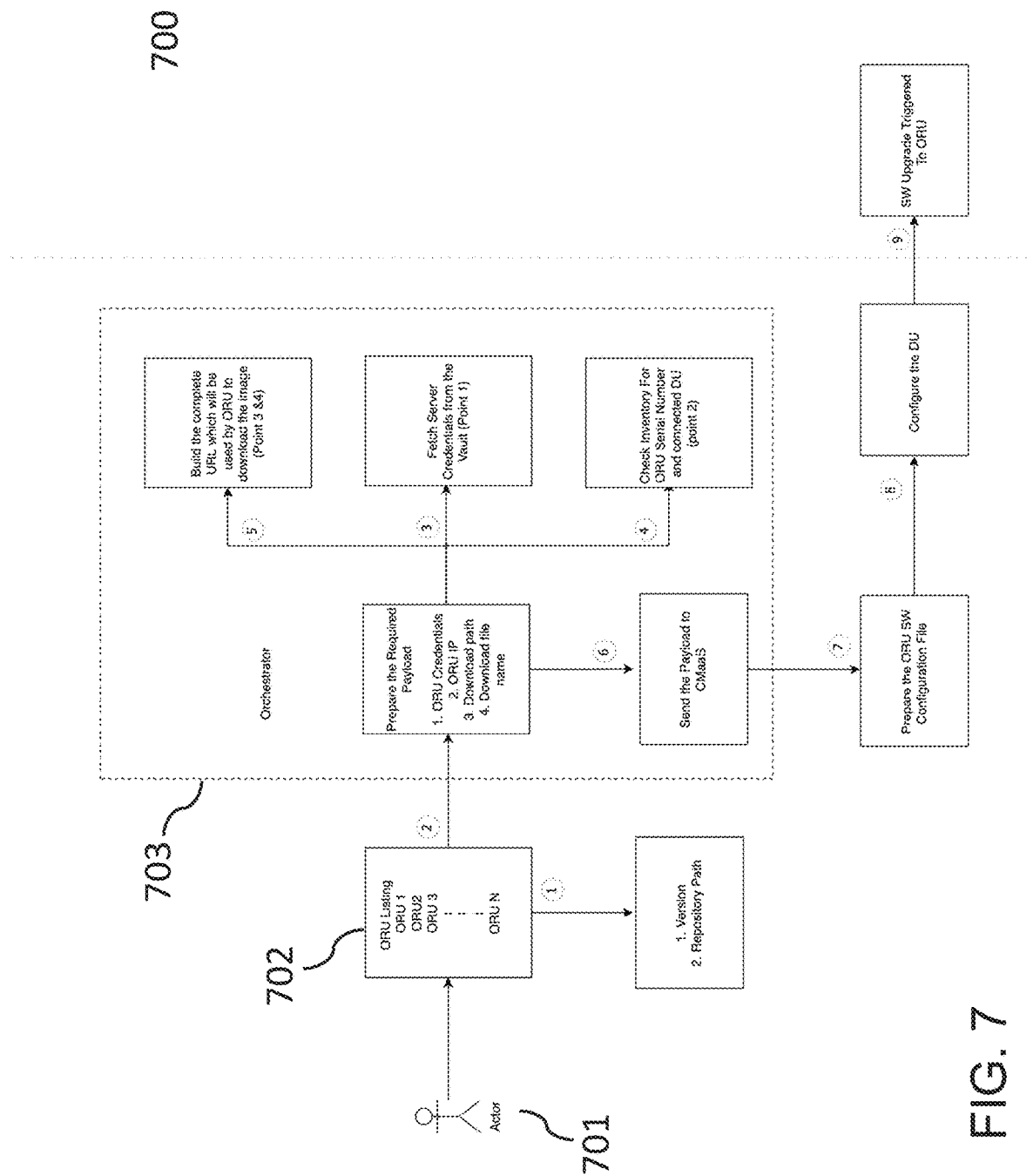
FIG. 7 is a block diagram of an operational flow, according to at least some embodiments of the subject disclosure.
Figure 8A:
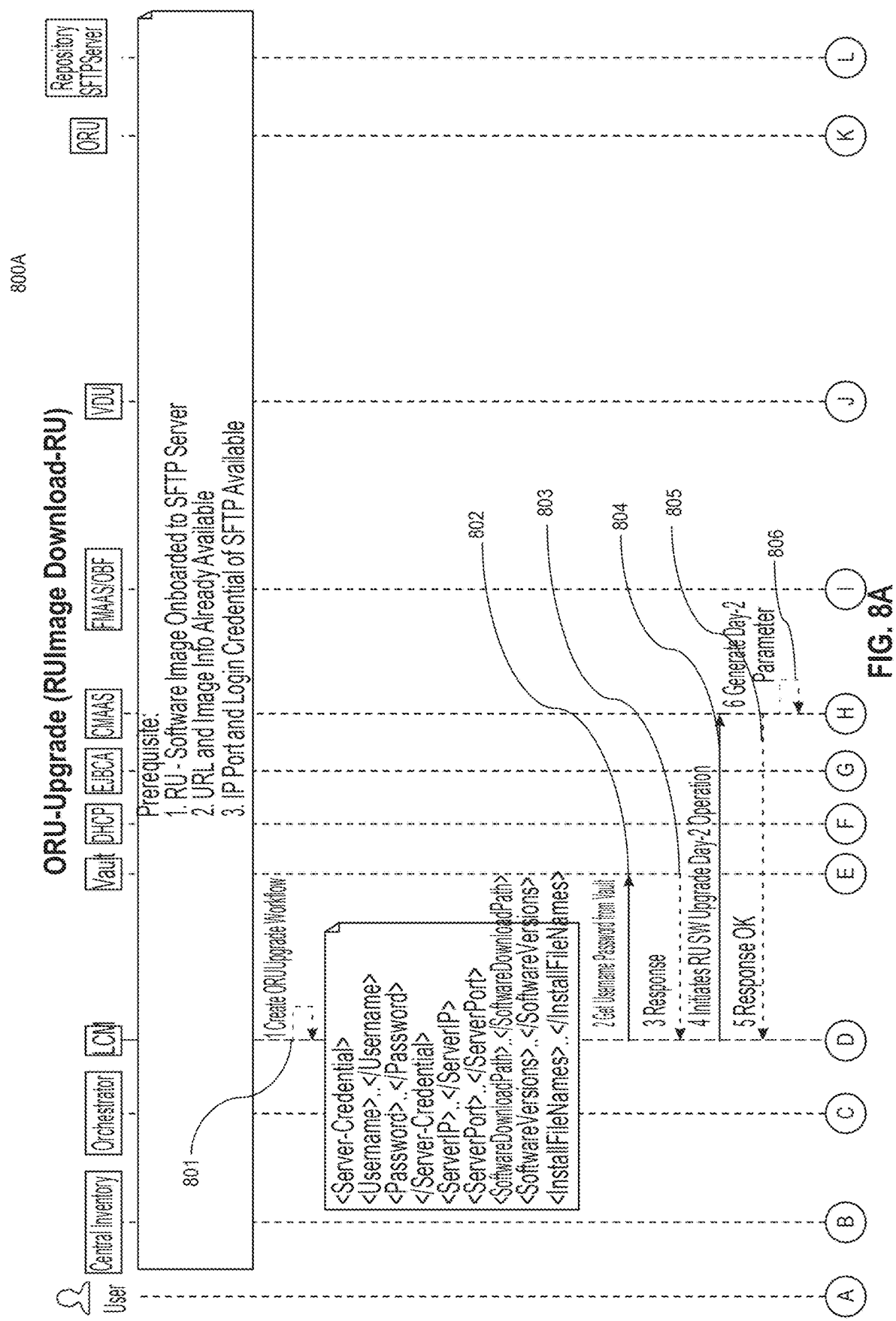
FIGS. 8A-8E are a sequence diagram, according to at least some embodiments of the subject disclosure.
Figure 8:
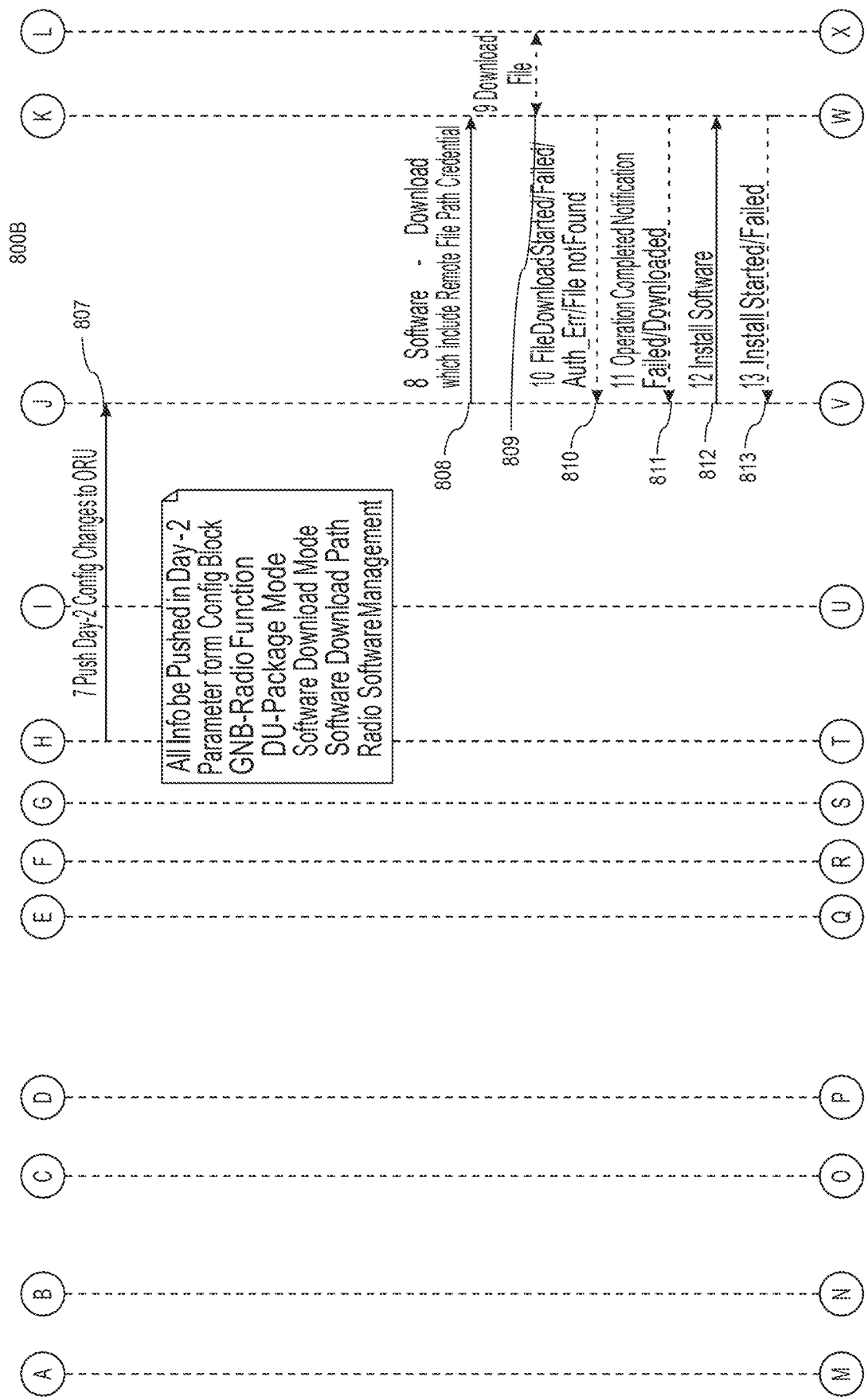
Figure 8C:
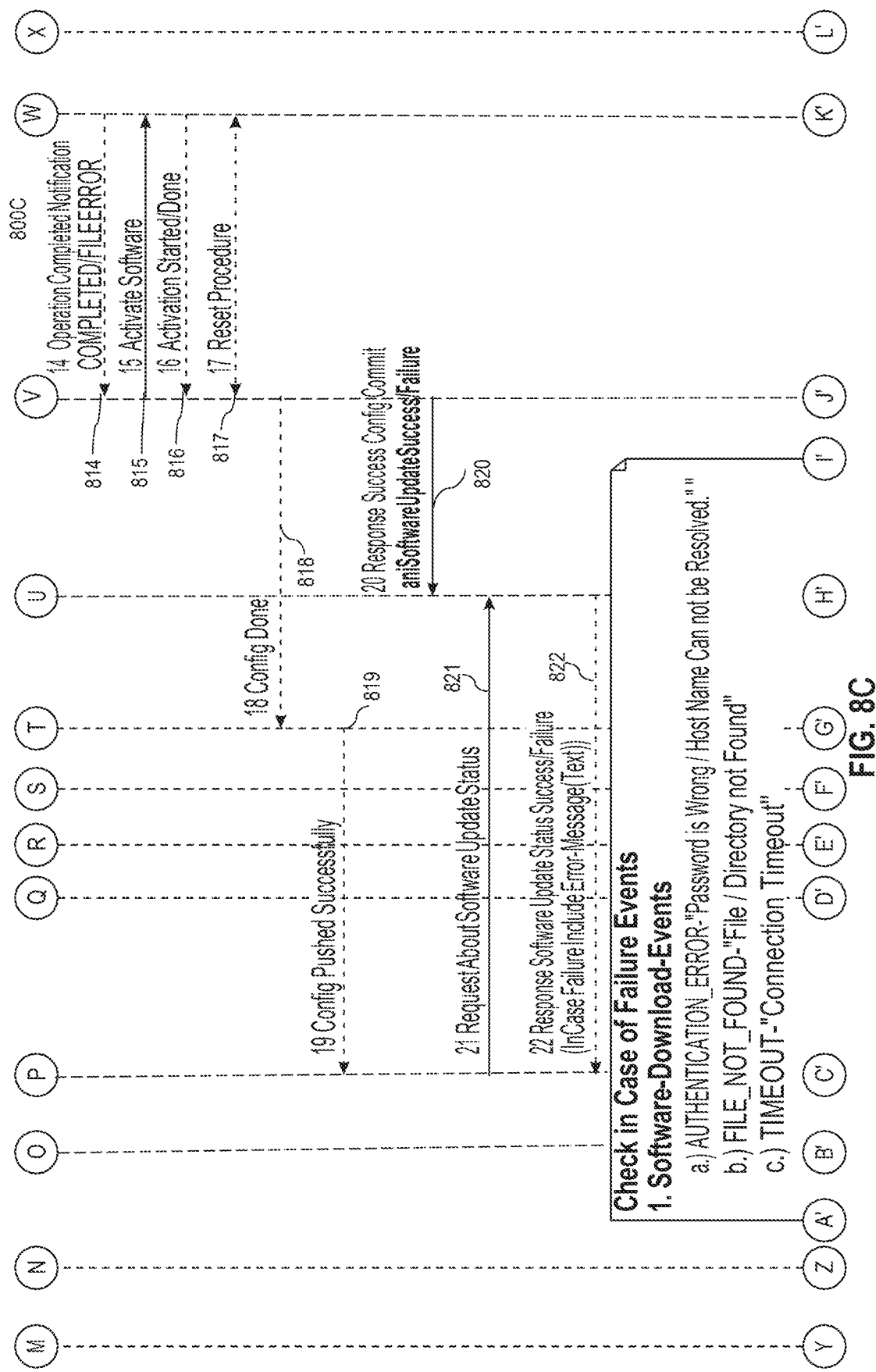
Figure 8E:
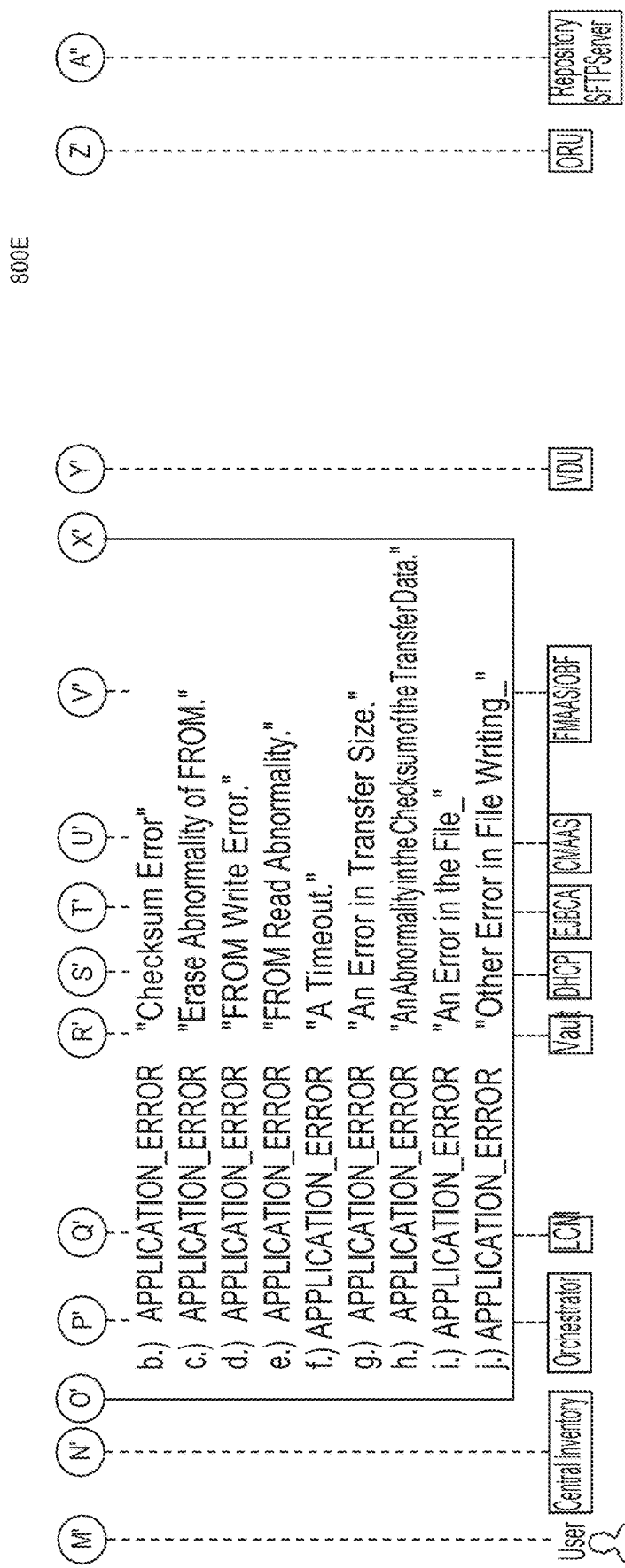

FIG. 7 is a block diagram of an operational flow 700, according to at least some embodiments of the subject disclosure.

FIG. 7 shows an example embodiment illustrating various module interactions, steps, and/or processes. For example, an actor/user 701 interacts with a user interface 702. User interface 702 displays a listing of various O-RAN components in a network, as described herein.

FIG. 7 shows, in a first stage, user 701 selects various O-RAN components, such as ORUs, for targeting with a software upgrade. As part of the first stage, user 701 is prompted to enter a name, version number, and/or repository path 702 as described herein.

FIG. 7 shows, in a second stage, a request is sent including selections and/or information gathered from user's 701 interactions with user interface 702 to orchestrator tool 703. Orchestrator, in response to receiving the request, begins a request processing sequence and/or cascade that ultimately triggers upgrading and/or updating O-RAN components selected by user 701.

FIG. 7 shows, in a third stage or as part of the sequence and/or cascade, orchestrator tool 703 fetches one or more sets of credentials, from a secure vault for example, needed to login to each of the respective selected O-RAN components.

FIG. 7 shows, in a fourth stage or as part of the sequence and/or cascade, orchestrator tool 703 checks for and/or retrieve a serial number or identifier corresponding to each of the respective selected O-RAN components, and/or each respective connected DU.

FIG. 7 shows, in a fifth stage or as part of the sequence and/or cascade, orchestrator tool 703 builds, assembles, and/or identifies a URL and/or location path at which a user-desired, identified, and/or selected upgrade software image has been stored. The URL or path is used by an O-RAN component for download of the software image. For example, an ORU downloads, from the URL or location path, an ORU software upgrade image.

In some embodiments, an ORU software upgrade is packaged together with or in a DU image. In some embodiments, an ORU software upgrade is stored or provided in a standalone RU image, separate and distinct from a corresponding DU image.

In some embodiments, an orchestrator tool assembles, creates, and/or prepares a payload using some or all of the user-input data, user-selections, and/or data identified, fetched, and/or assembled as described above. A payload is prepared according to processes described herein and includes information as described herein.

FIG. 7 shows, in a sixth stage or as part of the sequence and/or cascade, orchestrator tool 703 transmits, sends, and/ or delivers a prepared payload to a configuration module, such as a Configuration Management as a Service (CMaaS) module.

FIG. 7 shows, in a seventh stage or as part of the sequence and/or cascade, a configuration module, such as a Configuration Management as a Service (CMaaS) module, prepares a configuration file, such as an ORU software configuration file.

In some embodiments, in an eight stage or as part of the sequence and/or cascade, a configuration module, a configuration file is used to configure one or more respective DUs associated with each of the selected O-RAN components.

FIG. 7 shows, in a ninth stage or as part of the sequence and/or cascade, a software upgrade is triggered to each of the selected O-RAN components. For example, a software upgrade is triggered to multiple ORUs that were selected by a user using a user interface as described herein.

Error Handling

FIG. 7 shows, in a tenth stage or as part of the sequence and/or cascade, or as a separate sequence, a Fault Management as a Service (FMaaS) process is triggered, or a request to an FMaaS service is delivered. An FMaaS service provides information, or a response to such a request regarding errors or faults identified.

In some embodiments, errors are identified and one or more users are notified via, for example, a user interface as described herein. For example, in some embodiments, Failure Events are identified by codes such as numerical codes and/or text codes, and text strings (shown in quotations in these examples) for various cases are provided to a user for notification:

1. Software-Download-Events
  a.) AUTHENTICATION_ERROR—"Password is Wrong/Host Name Cannot be Resolved."
  b.) FILE_NOT_FOUND—"File/Directory not Found"
  c.) TIMEOUT—"Connection Timeout"
  d.) PROTOCOL_ERROR—"An Error was Detected with the Sftp Command"
  e.) APPLICATION_ERROR—"Other Error"

2. Software Install Failure-Events
Firmware Update Error Due
  a.) INTEGRITY_ERROR "Erase Abnormality of FROM-"
  b.) INTEGRITY_ERROR "FROM Write Error."
  c.) INTEGRITY_ERROR "FROM Read Abnormality."
  d.) APPLICATION_ERROR "An Address Size Error."
  e.) APPLICATION_ERROR "A Timeout."
  f.) APPLICATION_ERROR "An Error in Transfer Size."
  g.) APPLICATION_ERROR "An Abnormality in the Checksum of the Transfer Data."
  h.) APPLICATION_ERROR "Other Error in File Writing."
  i.) FILE_ERROR "Checksum Error."
  j.) FILE_ERROR "An Error in the File."
  k.) FILE_ERROR "An Error in the File Size."

3. Software Activation-Events
Boot Block Update Error Due
  a.) APPLICATION_ERROR "An Address Size Error-"
  b.) APPLICATION_ERROR "Checksum Error"
  c.) APPLICATION_ERROR "Erase Abnormality of FROM."
  d.) APPLICATION_ERROR "FROM Write Error."
  e.) APPLICATION_ERROR "FROM Read Abnormality."
  f.) APPLICATION_ERROR "A Timeout."
  g.) APPLICATION_ERROR "An Error in Transfer Size."
  i.) APPLICATION_ERROR "An Error in the File_"
  j.) APPLICATION_ERROR "Other Error in File Writing_"

FIGS. 8A-8E show sequence diagram 800, according to at least some embodiments of the subject disclosure.

FIGS. 8A-8E are a sequence diagrams 800A-800E, respectively, illustrating an example procedure according to some embodiments herein. In this example, a sequence is shown for an ORU upgrade using an RU software image download.

As shown in this example, in some embodiments, an ORU upgrade workflow is initiated 801 by a user. In response, an orchestrator tool fetches one or more sets of credentials 802 corresponding to one or more ORUs selected for upgrading from, for example, a secure vault wherein credentials are securely stored. A response 803 is received from a vault including, for example, requested credentials. A payload is prepared according to embodiments described herein. A payload is delivered in a request to a CMaaS module or service to initiate an ORU software upgrade 804 for one or more selected/targeted ORUs. CMaaS responds to requests to signal success or failure of one or more ORU upgrade initiations 805. CMaaS gathers additional information and/ or prepare one or more payloads and/or configuration files 806 which is pushed to one or more respective DU units or components 807. A software download process is triggered by the one or more DU units by one or more respective RU units 808. Download success and/or errors codes/messages is communicated from the one or more RU units to the one or more respective DU units triggering software download 809. Upon successful download, software installation is triggered on one or more RU units by one or more DU units 812. Installation success and/or errors codes/messages is communicated from the one or more RU units to the one or more respective DU units triggering software installation 813. Operation completion success and/or errors codes/ messages is communicated from the one or more RU units to the one or more respective DU units triggering software installation 814. Upon successful completion, software activation is triggered on one or more RU units by one or more DU units 815. Activation success and/or errors codes/messages is communicated from the one or more RU units to the one or more respective DU units triggering software installation 816. A reset is triggered on one or more RU units by one or more DU units 817.

Upon completion of a configuration, one or more DU units communicate completion to CMaaS module or service 818. CMaaS service, in turn, communicates a configuration success and/or failure message to one or more users, modules, and/or services 819. One or more DU units communicate configuration or other success/failure events to FMaaS module or service 820.

One or more users, modules, and/or services request a software status from FMaaS 821. FMaaS provides a response including success/failure events 822.

As shown in this example, a software image such as an RU software image corresponding to an upgrade is stored and/or onboarded to a server, such as an SFTP server. As also shown in this example, in some embodiments, the software image is available for download from a URL. As also shown in this example, in some embodiments, one or more server IP ports and one or more sets of login credentials for the SFTP server are available.

FIG. 9 is a block diagram of computer architecture 900 in accordance with some embodiments.

Computer architecture 900 includes a hardware processor 902 and a non-transitory, computer readable storage medium 904 encoded with, i.e., storing, the computer program code 906, i.e., a set of executable instructions. Computer readable storage medium 904 is also encoded with instructions 907 for interfacing with external devices. The processor 902 is electrically coupled to the computer readable storage medium 904 via a bus 908. The processor 902 is also electrically coupled to an I/O interface 910 by bus 908. A network interface 912 is also electrically connected to the processor 902 via bus 908. Network interface 912 is connected to a network 914, so that processor 902 and computer readable storage medium 904 are capable of connecting to external elements via network 914. The processor 902 is configured to execute the computer program code 906 encoded in the computer readable storage medium 904 in order to cause computer architecture 900 to be usable for performing a portion or all of the operations as described herein.

In some embodiments, the processor 902 is a central processing unit (CPU), a multi-processor, a distributed processing system, an application specific integrated circuit (ASIC), and/or a suitable processing unit.

In some embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 904 includes a compact disk-read only memory (CD-ROM), a compact disk-read/write (CD-R/W), and/or a digital video disc (DVD).

In some embodiments, the storage medium 904 stores the computer program code 906 configured to cause computer architecture 900 to perform a portion or all of the operations as described herein. In some embodiments, the storage medium 904 also stores information needed for performing a portion or all of the operations as described herein as well as information generated during performing a portion or all of the operations as described herein, such as a user interface parameter 916.

In some embodiments, the storage medium 904 stores instructions 907 for interfacing with external devices. The instructions 907 enable processor 902 to generate instructions readable by the external devices to effectively implement a portion or all of the operations as described herein.

Computer architecture 900 includes I/O interface 910. I/O interface 910 is coupled to external circuitry. In some embodiments, I/O interface 910 includes a keyboard, keypad, mouse, trackball, trackpad, and/or cursor direction keys for communicating information and commands to processor 902.

Computer architecture 900 also includes network interface 912 coupled to the processor 902. Network interface 912 allows computer architecture 900 to communicate with network 914, to which one or more other computer systems are connected. Network interface 912 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described herein, and information are exchanged between different computer architecture 900 via network 914.

Example Call Flow

An example call flow is shown, in accordance with at least some embodiments herein.

LCMAAS→CMAAS: Create ORU upgrade workflow

LCMAAS→CMAAS: initiates RU SW upgrade Day-2 Operation

CMAAS→LCM: Response OK

CMAAS→CMAAS: Generate day-2 Parameter

CMAAS→DU: Push Day-2 Config changes to ORU

Information may pushed in day-2 parameters from config block:

GNB-Radio function

DU-Package mode

Software download Mode

Software Download Path

Radio Software Management

DU→RU: software-download \n Which Include Remote file path \n Credential

RU↔RP: Download file

RU→DU: File download Started/Failed/AuthErr/File not found

RU→DU: Operation completed Notification Failed/Downloaded

DU→RU: Install Software

RU→DU: Install Started/Failed

RU→DU: Operation completed Notification COMPLETED/FILE_ERROR

DU→RU: Activate Software

RU→DU: Activation Started/Done

RU↔DU: Reset Procedure

DU→FO: Response Success Config Commit \n aniSoftwareUpdateSuccess/Failure

LCM→FO: Request about software update status

FO→LCM: Response Software update statusSuccess/Failure(in case failure include error-message(Text))

Checks for failure events:

*software-download-events To be supported in future release for NEC**

AUTHENTICATION_ERROR—"Password is wrong/Host name cannot be resolved."

FILE_NOT_FOUND—"File/directory not found"
TIMEOUT-"Connection timeout"
PROTOCOL_ERROR—"An error was detected with the sftp command"
APPLICATION_ERROR—"Other error"
*Software install Failure-event**
*Firmware update error due**
INTEGRITY_ERROR "Erase abnormality of FROM."
INTEGRITY_ERROR "FROM Write error."
INTEGRITY_ERROR "FROM Read abnormality."
APPLICATION_ERROR "An address size error."
APPLICATION_ERROR "A timeout."
APPLICATION_ERROR "An error in transfer size."
APPLICATION_ERROR "An abnormality in the checksum of the transfer data."
APPLICATION_ERROR "Other error in file writing."
FILE_ERROR "Checksum error."
FILE_ERROR "An error in the file."
FILE_ERROR "An error in the file size."
*Software activation-event**
*Boot block update error due**
APPLICATION_ERROR "An address size error."
APPLICATION_ERROR "Checksum error"
APPLICATION_ERROR "Erase abnormality of FROM."
APPLICATION_ERROR "FROM Write error."
APPLICATION_ERROR "FROM Read abnormality."
APPLICATION_ERROR "A timeout."
APPLICATION_ERROR "An error in transfer size."
APPLICATION_ERROR "An abnormality in the checksum of the transfer data."
APPLICATION_ERROR "An error in the file."
APPLICATION_ERROR "Other error in file writing."
RU↔DHCP: Get IP and CA detail
RU↔EJBCA: Get enrolled with CA certificate
RU↔O: TLS handshake
RU↔O: Netconf call home establishment
RU↔O: Exchange ORU serial no
→CI:ORU Parented to DU FQDN \n DU FQDN IS MGMT FQDN OF RUMGR POD OF DU
CI→O: Response
O↔RU: Set DU FQDN
O↔RU: Fetch Session detail
RU↔O: Set Periodic timer
RU↔DU: Establish Netconf Connection with DU
ORU will Setup the Connection with Parent ODU and further configuration will be transferred over netconf between ORU and ODU
DU→RU: Push Radio related configuration
RU→DU: Success
*Cell Operational after config procedure done**
For Every Subsequent PON same Steps to be Followed between SMO and ORU
<idle-timeout>60</idle-timeout> Can be set accordingly
<reconnect_timeout>1440</reconnect_timeout> can be set Max 65535 Min (45 Days)

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the subject disclosure.

While embodiments of the subject disclosure have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

Supplemental Note 1

A system for concerted upgrade deployment comprising a memory storing computer-readable instructions; and one or more processors connected to the memory. The one or more processors are configured to execute the computer-readable instructions for receiving a first user selection of a first set of O-RAN units from a selectable list of O-RAN units. The one or more processors are configured to execute the computer-readable instructions for receiving a version identifier of a first upgrade. The one or more processors are configured to execute the computer-readable instructions for receiving a path associated with the first upgrade. The one or more processors are configured to execute the computer-readable instructions for receiving a first request to deploy the first upgrade to the first set of O-RAN units. The one or more processors are configured to execute the computer-readable instructions for in response to receiving the first request, preparing a first standardized configuration payload. The first standardized configuration payload comprises the version identifier of the first upgrade; and the path associated with the first upgrade. The one or more processors are configured to execute the computer-readable instructions for instructing a transmitter to transmit the first standardized configuration payload in a first configuration file to a configuration management module or service.

Supplemental Note 2

The system for concerted upgrade deployment of Supplemental Note 1, wherein the selectable list of one or more O-RAN units comprises: a serial number for the one or more O-RAN units; and a version number for the one or more O-RAN units.

Supplemental Note 3

The system for concerted upgrade deployment of Supplemental Note 1 or 2, wherein the one or more processors is configured to execute the instructions for preparing the first standardized configuration payload by fetching one or more sets of login credentials corresponding to each of the first set of O-RAN units; and fetching one or more server Internet Protocol (IP) addresses corresponding to each of the first set of O-RAN units.

Supplemental Note 4

The system for concerted upgrade deployment of any of Supplemental Notes 1-3, wherein the one or more processors is further configured to execute the instructions for receiving an upgrade report following the instructing the transmitter to transmit the first standardized configuration payload; and performing a fault management process based on the upgrade report.

Supplemental Note 5

The system for concerted upgrade deployment of any of Supplemental Notes 1-4, wherein the one or more processors is configured to execute instructions for: generating a notification in response to the fault management process indicating at least one error; and instructing a display to display the notification.

Supplemental Note 6

The system for concerted upgrade deployment of any of Supplemental Note 1-5, wherein the notification comprises at least one of a software download error; a software installation error; or a software activation error.

Supplemental Note 7

The system for concerted upgrade deployment of any of Supplemental Notes 1-6, wherein the one or more processors is configured to execute the instructions for instructing a display to display the selectable list of O-RAN units; and wherein the receiving the first user selection is based on a received input following the display of the selectable list of O-RAN units.

Supplemental Note 8

A method executed by one or more processors for concerted upgrade deployment comprising receiving a first user selection of a first set of O-RAN units from a selectable list of O-RAN units. The method further includes receiving a version identifier of a first upgrade. The method further includes receiving a path associated with the first upgrade. The method further includes receiving a first request to deploy the first upgrade to the first set of O-RAN units. The method further includes in response to receiving the first request, preparing a first standardized configuration payload. The first standardized configuration payload comprises the version identifier of the first upgrade; and the path associated with the first upgrade. The method further includes transmitting the first standardized configuration payload in a first configuration file to a configuration management module or service.

Supplemental Note 9

The method for concerted upgrade deployment of Supplemental Note 8, wherein the selectable list of one or more O-RAN units comprises: a serial number for the one or more O-RAN units; and a version number for the one or more O-RAN units.

Supplemental Note 10

The method for concerted upgrade deployment of Supplemental Note 8 or 9, wherein the preparing the first standardized configuration payload comprises: fetching one or more sets of login credentials corresponding to each of the first set of O-RAN units; and fetching one or more server Internet Protocol (IP) addresses corresponding to each of the first set of O-RAN units.

Supplemental Note 11

The method for concerted upgrade deployment of any of Supplemental Notes 8-10, further comprising: receiving an upgrade report following the instructing the transmitter to transmit the first standardized configuration payload; and performing a fault management process based on the upgrade report.

Supplemental Note 12

The method for concerted upgrade deployment of any of Supplemental Notes 8-11, further comprising: generating a notification in response to the fault management process indicating at least one error; and displaying the notification.

Supplemental Note 13

The method for concerted upgrade deployment of any of Supplemental Notes 8-12, wherein the notification comprises at least one of: a software download error; a software installation error; or a software activation error.

Supplemental Note 14

The method for concerted upgrade deployment of any of Supplemental Notes 8-13, further comprising: displaying the selectable list of O-RAN units; and wherein the receiving the first user selection is based on a received input following the display of the selectable list of O-RAN units.

Supplemental Note 15

A non-transitory computer-readable medium including instructions executable by one or more processors to cause the one or more processors to perform operations for concerted upgrade deployment. The operations comprise receiving a first user selection of a first set of O-RAN units from a selectable list of O-RAN units. The operations further comprise receiving a version identifier of a first upgrade. The operations further comprise receiving a path associated with the first upgrade. The operations further comprise receiving a first request to deploy the first upgrade to the first set of O-RAN units. The operations further comprise in response to receiving the first request, preparing a first standardized configuration payload. The first standardized configuration payload comprises: the version identifier of the first upgrade; and the path associated with the first upgrade. The operations further comprise instructing a transmitter to transmit the first standardized configuration payload in a first configuration file to a configuration management module or service.

Supplemental Note 16

The computer-readable medium of Supplemental Note 15, wherein the selectable list of one or more O-RAN units comprises: a serial number for the one or more O-RAN units; and a version number for the one or more O-RAN units.

Supplemental Note 17

The computer-readable medium of Supplemental Note 15 or 16, wherein the preparing the first standardized configuration payload comprises: fetching one or more sets of login credentials corresponding to each of the first set of O-RAN units; and fetching one or more server Internet Protocol (IP) addresses corresponding to each of the first set of O-RAN units.

Supplemental Note 18

The computer-readable medium of any of Supplemental Notes 15-17, the operations further comprising: receiving an upgrade report following the instructing the transmitter to transmit the first standardized configuration payload; and performing a fault management process based on the upgrade report.

Supplemental Note 19

The computer-readable medium of any of Supplemental Notes 15-18, the operations further comprising: generating a notification in response to the fault management process indicating at least one error; and instructing a display to display the notification.

Supplemental Note 20

The computer-readable medium of any of Supplemental Notes 15-19, wherein the notification comprises at least one of: a software download error; a software installation error; or a software activation error.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for concerted upgrade deployment comprising:
 a memory storing computer-readable instructions; and
 one or more processors connected to the memory, wherein the one or more processors are configured to execute the computer-readable instructions for:
  receiving information indicating one or more open radio access network (O-RAN) units to be updated, wherein the information is generated in response to selection of one or more units from a light comprising units that are operable in an O-RAN;
  receiving a version identifier of a first upgrade;
  receiving a path associated with the first upgrade;
  receiving a first request to deploy the first upgrade to the one or more O-RAN units;
  in response to receiving the first request, preparing a first standardized configuration payload,
   wherein the first standardized configuration payload comprises:
    the version identifier of the first upgrade; and
    the path associated with the first upgrade;
  instructing a transmitter to transmit the first standardized configuration payload in a first configuration file to a configuration management module or service;
  receiving an indication of a fault during upgrading of the one or more O-RAN units; and
  performing a fault management process on the one or more O-RAN units in response to receiving the indication of the fault.

2. The system for concerted upgrade deployment of claim 1, wherein receiving the information indicating the one or more O-RAN units comprises receiving selection information from a selectable list of the one or more O-RAN units, and the selectable list comprises:
 a serial number for the one or more O-RAN units; and
 a version number for the one or more O-RAN units.

3. The system for concerted upgrade deployment of claim 1, wherein the one or more processors is configured to execute the instructions for preparing the first standardized configuration payload by:
 fetching one or more sets of login credentials corresponding to each of the first set of O-RAN units; and
 fetching one or more server Internet Protocol (IP) addresses corresponding to each of the first set of O-RAN units.

4. The system for concerted upgrade deployment of claim 1, wherein the one or more processors is further configured to execute the instructions for:
 receiving an upgrade report following the instructing the transmitter to transmit the first standardized configuration payload; and
 performing the fault management process based on the upgrade report.

5. The system for concerted upgrade deployment of claim 4, wherein the one or more processors is configured to execute instructions for:
 generating a notification in response to the fault management process indicating at least one error; and
 instructing a display to display the notification.

6. The system for concerted upgrade deployment of claim 5, wherein the notification comprises at least one of:
 a software download error;
 a software installation error; or
 a software activation error.

7. The system for concerted upgrade deployment of claim 2, wherein the one or more processors is configured to execute the instructions for:
 instructing a display to display the selectable list of O-RAN units; and
 wherein the receiving the first user selection is based on a received input following the display of the selectable list of O-RAN units.

8. A method executed by one or more processors for concerted upgrade deployment comprising:
 receiving information indicating one or more open radio access network (O-RAN) units to be updated, wherein the information is generated in response to selection of one or more units from a light comprising units that are operable in an O-RAN;
 receiving a version identifier of a first upgrade;
 receiving a path associated with the first upgrade;
 receiving a first request to deploy the first upgrade to the one or more O-RAN units;
 in response to receiving the first request, preparing a first standardized configuration payload,
  wherein the first standardized configuration payload comprises:
   the version identifier of the first upgrade; and
   the path associated with the first upgrade;
 transmitting the first standardized configuration payload in a first configuration file to a configuration management module or service;
 receiving an indication of a fault during upgrading of at least one of the one or more O-RAN units; and
 performing a fault management process on the one or more O-RAN units in response to receiving the indication of the fault.

9. The method for concerted upgrade deployment of claim 8, wherein receiving the information indicating the one or more O-RAN units comprises receiving selection information from a selectable list of one or more O-RAN units, and the selectable list comprises:
 a serial number for the one or more O-RAN units; and
 a version number for the one or more O-RAN units.

10. The method for concerted upgrade deployment of claim 8, wherein the preparing the first standardized configuration payload comprises:
 fetching one or more sets of login credentials corresponding to each of the first set of O-RAN units; and
 fetching one or more server Internet Protocol (IP) addresses corresponding to each of the first set of O-RAN units.

11. The method for concerted upgrade deployment of claim 8, further comprising:
 receiving an upgrade report following the instructing the transmitter to transmit the first standardized configuration payload; and
 performing the fault management process based on the upgrade report.

12. The method for concerted upgrade deployment of claim 11, further comprising:
generating a notification in response to the fault management process indicating at least one error; and
displaying the notification.

13. The method for concerted upgrade deployment of claim 12, wherein the notification comprises at least one of:
a software download error;
a software installation error; or
a software activation error.

14. The method for concerted upgrade deployment of claim 9, further comprising:
displaying the selectable list of O-RAN units; and
wherein the receiving the first user selection is based on a received input following the display of the selectable list of O-RAN units.

15. A non-transitory computer-readable medium including instructions executable by one or more processors to cause the one or more processors to perform operations for concerted upgrade deployment, the operations comprising:
receiving information indicating one or more open radio access network (O-RAN) units to be updated, wherein the information is generated in response to selection of one or more units from a light comprising units that are operable in an O-RAN;
receiving a version identifier of a first upgrade;
receiving a path associated with the first upgrade;
receiving a first request to deploy the first upgrade to the one or more O-RAN units;
in response to receiving the first request, preparing a first standardized configuration payload,
wherein the first standardized configuration payload comprises:
the version identifier of the first upgrade; and
the path associated with the first upgrade;
instructing a transmitter to transmit the first standardized configuration payload in a first configuration file to a configuration management module or service;
receiving an indication of a fault during upgrading of the one or more O-RAN units; and
performing a fault management process on the one or more O-RAN units in response to receiving the indication of the fault.

16. The non-transitory computer-readable medium of claim 15, wherein receiving the information indicating the one or more O-RAN units comprises receiving selection information from a selectable list of one or more O-RAN units, and the selectable list comprises:
a serial number for the one or more O-RAN units; and
a version number for the one or more O-RAN units.

17. The non-transitory computer-readable medium of claim 15, wherein the preparing the first standardized configuration payload comprises:
fetching one or more sets of login credentials corresponding to each of the first set of O-RAN units; and
fetching one or more server Internet Protocol (IP) addresses corresponding to each of the first set of O-RAN units.

18. The non-transitory computer-readable medium of claim 15, the operations further comprising:
receiving an upgrade report following the instructing the transmitter to transmit the first standardized configuration payload; and
performing the fault management process based on the upgrade report.

19. The non-transitory computer-readable medium of claim 18, the operations further comprising:
generating a notification in response to the fault management process indicating at least one error; and
instructing a display to display the notification.

20. The non-transitory computer-readable medium of claim 19, wherein the notification comprises at least one of:
a software download error;
a software installation error; or
a software activation error.

* * * * *